Jan. 4, 1966       H. H. FISHER, JR., ETAL       3,227,218
                    LINER HANGING APPARATUS
Filed May 20, 1963                            6 Sheets-Sheet 1
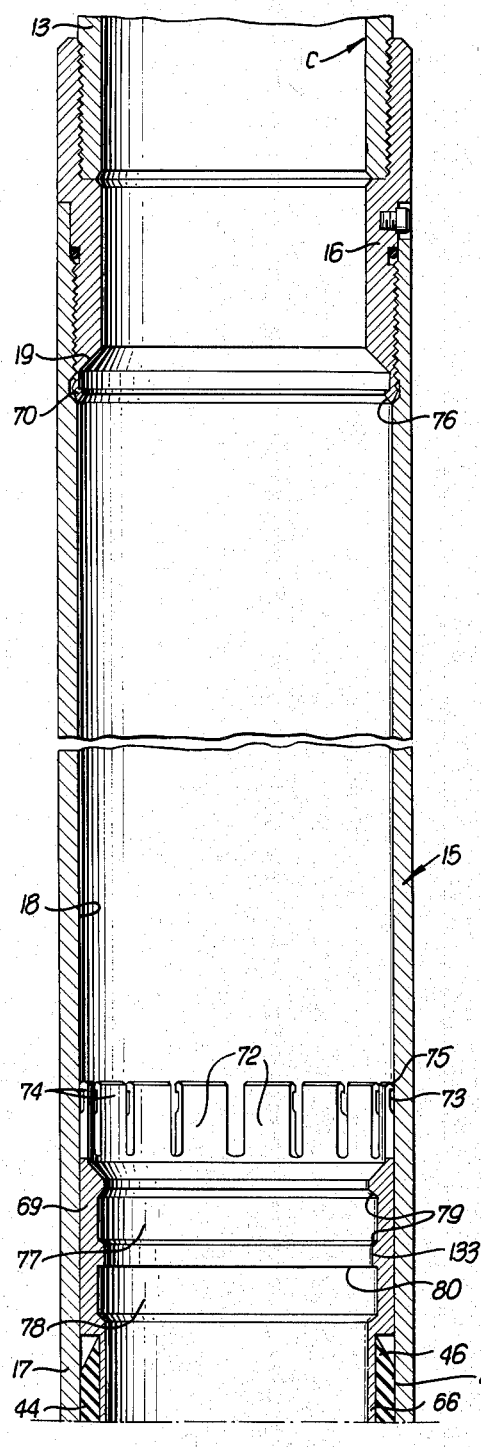
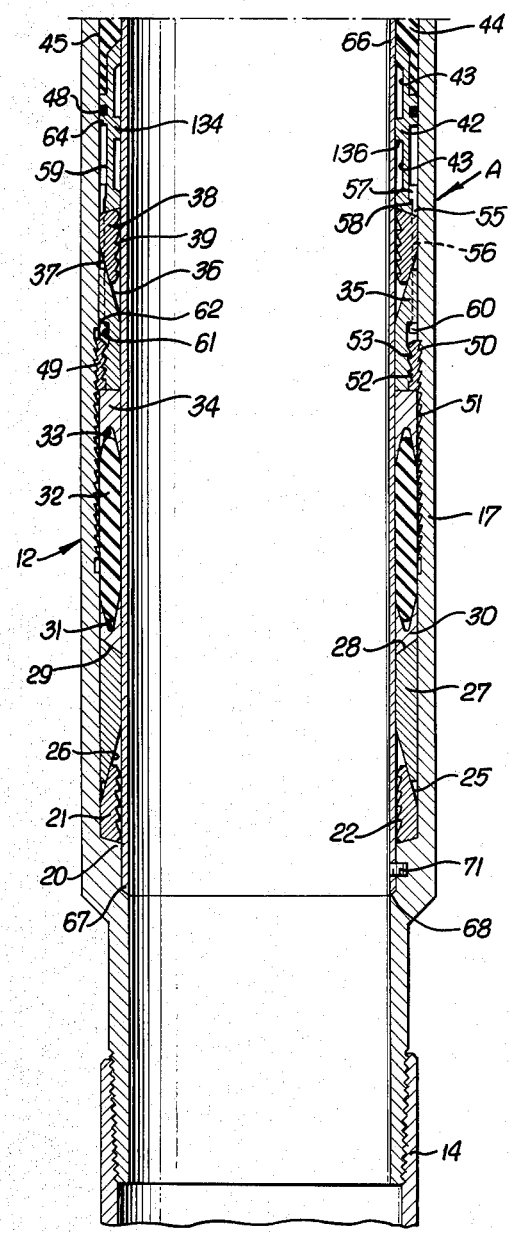
HIRAM H. FISHER, JR.
WILLIAM D. MYERS
INVENTORS.
BY
Mellin and Hanscom
ATTORNEYS.

Jan. 4, 1966   H. H. FISHER, JR., ETAL   3,227,218
LINER HANGING APPARATUS

Filed May 20, 1963   6 Sheets-Sheet 2

HIRAM H. FISHER, JR.
WILLIAM D. MYERS
INVENTORS.

BY
Mellin and Hanscom
ATTORNEYS.

Jan. 4, 1966     H. H. FISHER, JR., ETAL     3,227,218
LINER HANGING APPARATUS
Filed May 20, 1963                        6 Sheets-Sheet 3
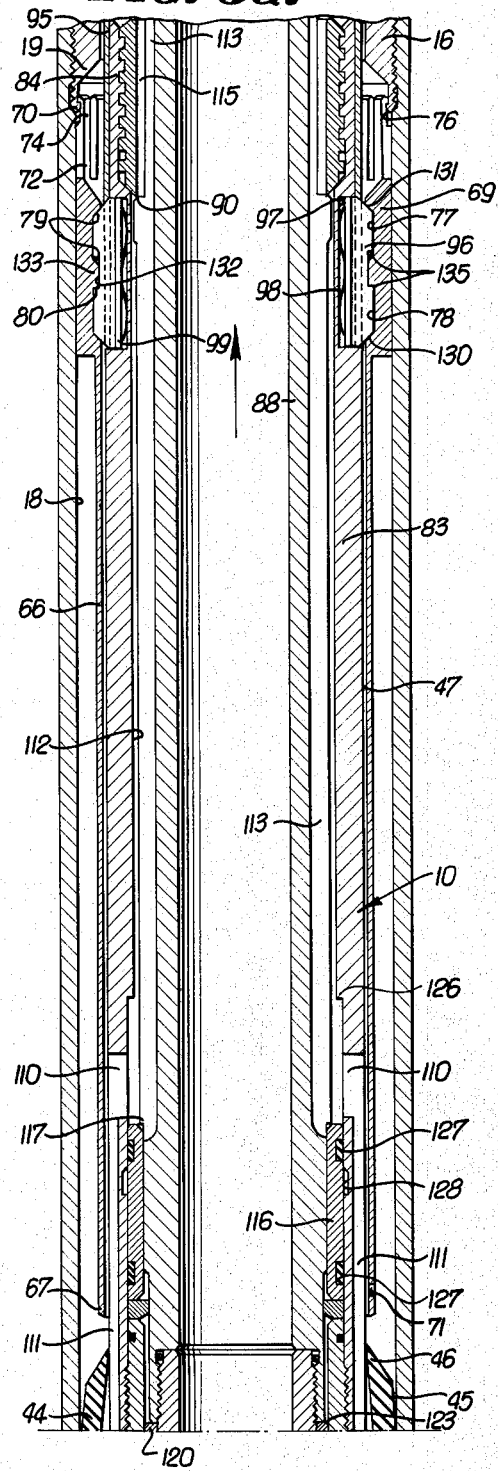
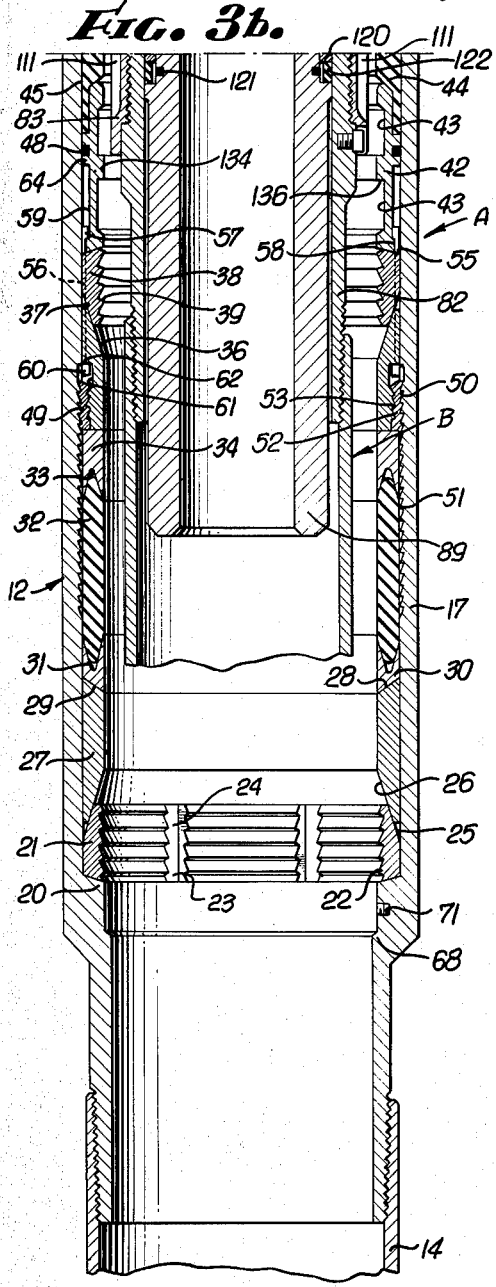
HIRAM H. FISHER, JR.
WILLIAM D. MYERS
INVENTOR.
BY
*Mellin and Hanson*
ATTORNEYS.

Jan. 4, 1966  H. H. FISHER, JR., ETAL  3,227,218
LINER HANGING APPARATUS
Filed May 20, 1963  6 Sheets-Sheet 4

HIRAM H. FISHER, JR.
WILLIAM D. MYERS
INVENTORS.

BY
Mellin and Hanscom
ATTORNEYS.

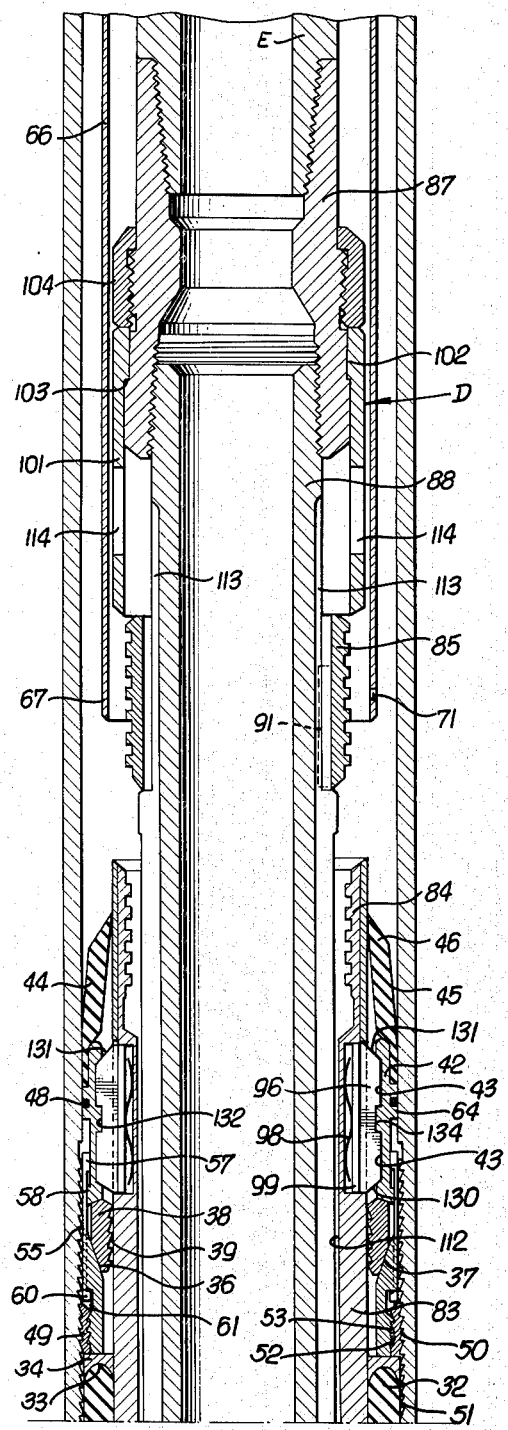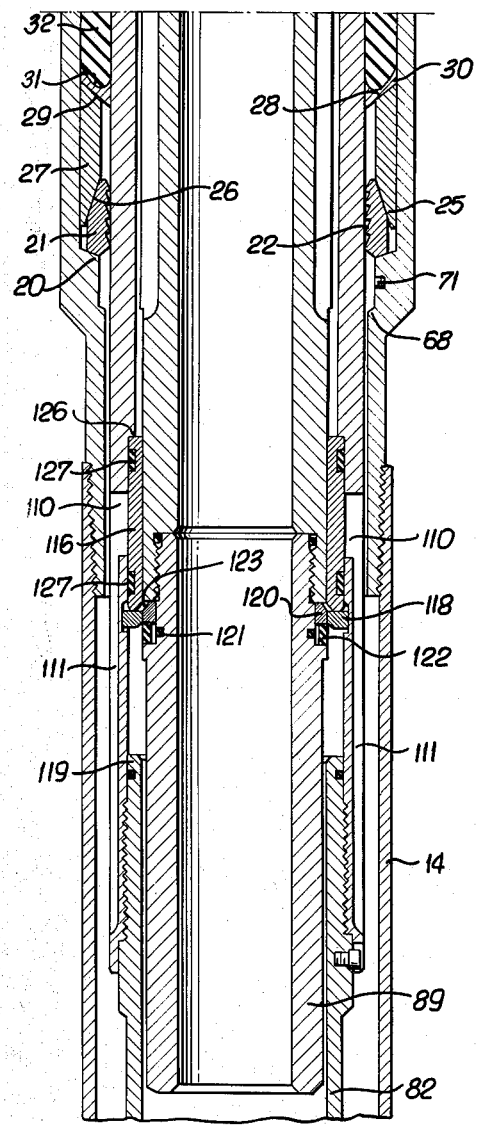

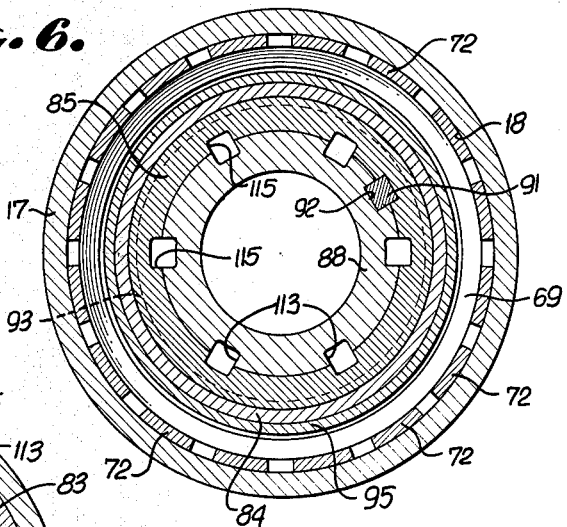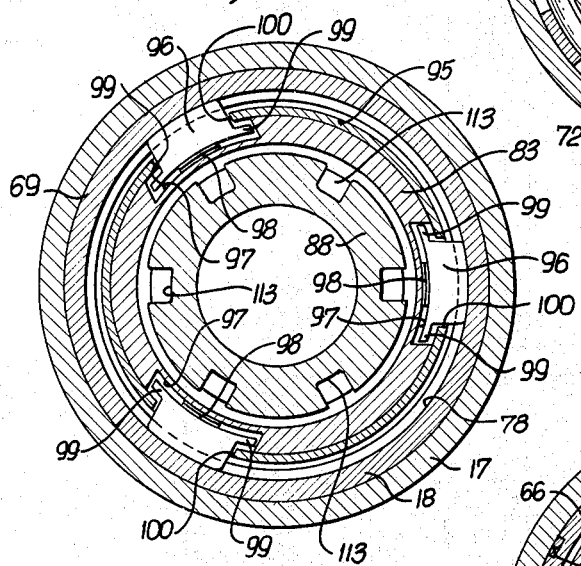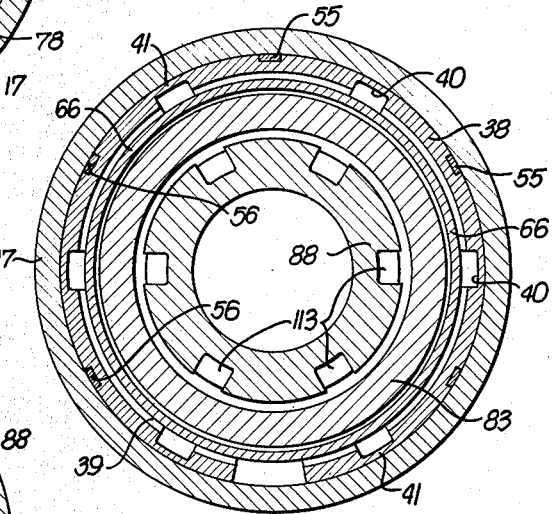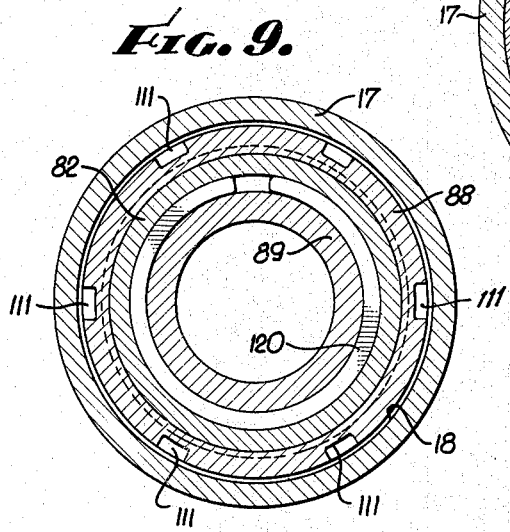
HIRAM H. FISHER, JR.
WILLIAM D. MYERS
INVENTORS.

United States Patent Office 3,227,218
Patented Jan. 4, 1966

3,227,218
LINER HANGING APPARATUS
Hiram H. Fisher, Jr., and William D. Myers, Houston, Tex., assignors to Baker Oil Tools, Inc., Los Angeles, Calif., a corporation of California
Filed May 20, 1963, Ser. No. 281,409
19 Claims. (Cl. 166—216)

The present invention relates to subsurface well bore apparatus, and more particularly to apparatus for setting or hanging liners, and the like, in casing strings disposed in well bores.

An object of the invention is to provide liner setting or hanging apparatus adapted to be incorporated in a casing string disposed in a well bore, and in which actuation of the apparatus is prevented prior to lowering of a liner therewithin to its setting location.

Another object of the invention is to provide liner setting or hanging apparatus adapted to be incorporated in a casing string disposed in a well bore and embodying one or more inwardly movable members to be set against the liner when disposed therewithin, in which such inwardly movable members are protected prior to setting of the liner in the casing to prevent their inadvertent actuation, as under the influence of a drill string during drilling of the well bore in which the liner is to be later disposed, as a result of running other devices, including the liner itself, therethrough, or during the performance of other operations in the well bore.

A further object of the invention is to provide liner setting or hanging apparatus to be incorporated in a casing string disposed in a well bore and embodying a protective device for preventing premature actuation of the apparatus, in which the protective device can be shifted to an ineffective position preparatory to setting of the liner, preferably after the liner has been run in the well bore to its desired location therein.

An additional object of the invention is to provide liner setting or hanging apparatus adapted to be incorporated in a casing string disposed in a well bore and adapted to be actuated either mechanically or hydraulically into setting relation with a liner after the latter has been disposed therewithin.

Yet another object of the invention is to provide apparatus adapted to be incorporated in a casing string in a well bore for setting a liner therewithin in packed-off condition, in which circulation can be established through and around the liner after its setting in the well casing. If desired, after circulation has been completed, as following cementing of the liner in place, the circulation path can be closed.

This invention possesses many other advantages, and has other objects which may be made more clearly apparent from a consideration of a form in which it may be embodied. This form is shown in the drawings accompanying and forming part of the present specification. It will now be described in detail, for the purpose of illustrating the general principles of the invention; but it is to be understood that such detailed description is not to be taken in a limiting sense, since the scope of the invention is best defined by the appended claims.

Referring to the drawings:

FIGURES 1a and 1b together constitute a portion of a casing string disposed in a well bore, with the liner hanging apparatus in its initial or ineffective condition, FIG. 1b being a lower continuation of FIG. 1a;

FIGS. 2a and 2b are views corresponding to FIGS. 1a and 1b disclosing the liner and its running-in tool disposed within the apparatus, the liner hanging apparatus still being in its initial ineffective condition, FIG. 2b being a lower continuation of FIG. 2a;

FIGS. 3a and 3b are views corresponding to FIGS. 2a and 2b, illustrating the protective portion of the liner hanging apparatus removed, FIG. 3b being a lower continuation of FIG. 3a;

FIGS. 4a and 4b are views corresponding to FIGS. 2a and 2b, illustrating the liner hanging apparatus anchored in packed-off condition against the liner, circulation of fluid being obtainable through and around the liner, FIG. 4b being a lower continuation of FIG. 4a;

FIGS. 5a and 5b are views similar to FIGS. 4a and 4b, illustrating the circulation path closed and the running-in tool released from the liner, FIG. 5b being a lower continuation of FIG. 5a;

FIG. 6 is an enlarged cross-section taken along the line 6—6 on FIG. 2a;

FIG. 7 is an enlarged cross-section taken along the line 7—7 on FIG. 2a;

FIG. 8 is an enlarged cross-section taken along the line 8—8 on FIG. 2b;

FIG. 9 is an enlarged cross-section taken along the line 9—9 on FIG. 2b.

Figure 2A:
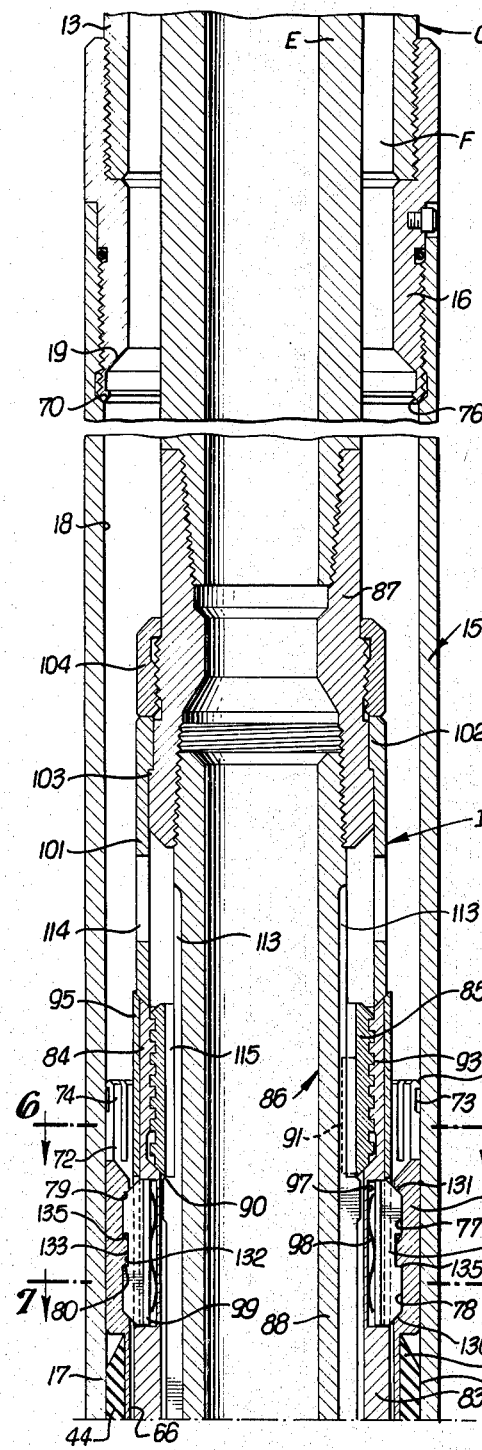

The apparatus disclosed in the drawings includes a device A for hanging a liner B from the lower portion of a string of well casing C extending in a well bore to the top thereof. The device is incorporated in the casing string itself when the latter is run in the well bore and prior to being cemented therewithin. Subsequently, the liner B is lowered on a running-in tool D, secured to a tubular string E, down through the casing string to a desired position therewithin, the liner itself extending into the well bore below the casing string, in a known manner. It is anchored to the casing string in packed-off condition by actuating the apparatus A to move its elements into engagement with the upper hanging portion 10 of the liner B. Circulation can then be established down through the tubular string E and the liner B, fluid being permitted to pass upwardly around the liner and into the tubing-casing annulus F thereabove. After the liner has been cemented in place, the circulation path can be closed and the running-in tool D released from the liner, allowing the running-in tool to be removed from the well bore by elevating the tubular string E within the casing. Prior to setting of the liner in the well casing, the parts of the hanging device A incorporated in the casing string are fully protected against the action of other equipment that may be used in the well bore, such as drill bits and drill pipe employed for drilling the well bore below the casing string C, the running of other equipment, such as formation testers, and the like, in the well bore, etc. Preferably, the protective device is removed only immediately prior to the actual setting of the liner B in the well casing through use of parts of the liner hanging apparatus.

As disclosed, the liner hanging apparatus A constitutes part of the casing string itself, being mounted within a casing collar 12 that can connect upper and lower sections 13, 14 of the casing string in spaced relation. The casing collar includes a main body or tubular member 15 comprising an upper section 16 threadedly secured to the lower end of the upper casing section 13, this upper section being threadedly attached to a lower tubular member section 17, which is, in turn, threadedly attached to the upper end of the lower casing section 14. The tubular member 15, along an extended length, has an enlarged internal diameter with respect to the nominal internal diameter of the casing string C, to provide an elongate recess 18 in which the liner hanging parts are retained free from restriction of the path through the casing string. The elongate recess terminates at an upper shoulder 19 provided by the lower end of the upper tubular member section 16, and by a lower shoulder 20 at the lower portion of the lower tubular member section 17.

The specific liner hanging apparatus illustrated in the drawings includes a lower slip or anchoring sleeve 21 engaging the lower shoulder 20 and having inner teeth 22 facing in a downward direction, which are adapted to be anchored against a portion 10 of the liner B itself. The lower slip sleeve 21 is split longitudinally, which will permit its inward contraction. It is also provided with circumferentially spaced longitudinal grooves 23 providing weakened sections 24 at which the sleeve may break into segments when moved laterally inwardly. This lower slip sleeve has an external expander surface 25 tapering in an upward and inward direction and engaged by a companion internal tapered surface 26 on a lower expander 27 that is slidable along the inner wall 18 of the tubular member 15. The upper end 28 of the lower expander is inclined in a downward and inward direction, engaging a companion taper 29 on the lower end of an extrusion preventing ring 30, which may be made of a malleable material, such as aluminum or mild steel, that will deform inwardly to an effective smaller internal diameter than its initial internal diameter. This extrusion preventing ring 30 has an upper circumferential pocket or recess 31 receiving the lower end of a pliant, elastic packing sleeve 32, of rubber or rubber-like material, the upper end of which is received within a downwardly facing pocket 33 of an upper extrusion preventing ring 34, made of a suitable material, such as mild steel or aluminum, this upper extrusion preventing ring engaging the lower end of an upper expander 35 slidable downwardly along the inner wall 18 of the tubular member 15. This upper expander has an upper inner expander surface 36 inclined upwardly in an outward direction and engaging a companion external tapered surface 37 on an upper split slip or anchoring sleeve 38 that can contract inwardly. This slip sleeve has a set of internal teeth 39 facing in an upward direction for engagement with the surface of the portion 10 of the liner B to support the latter against downward movement. The upper slip sleeve also has a plurality of circumferentially spaced longitudinal grooves 40 (FIG. 8) therein providing weakened sections 41 at which the sleeve may break into segments upon being shifted laterally inwardly by the upper expander 35 into engagement with the portion 10 of the liner, as described hereinbelow.

The slips 21, 38 and packing structure 30–34 are shifted inwardly as a result of moving a setting sleeve or ring 42 downwardly along the tubular section 17. This setting sleeve may be shifted downwardly mechanically or hydraulically. As shown, it has a pair of internal circumferential locating grooves 43 therein adapted to be engaged by a setting member, which becomes coupled thereto and which enables downward movement of the setting sleeve to occur, as described hereinbelow. The setting sleeve 42 also has a pliant, elastic packing element 44, such as a cup-type packing member, secured thereto, its outer portion 45 engaging the inner wall 18 of the tubular member 17 and its upper lip portion 46 tending to inherently deflect inwardly so as to seal against an external periphery 47 of the portion 10 of the liner, as explained hereinbelow. As assurance against leakage of fluid around the exterior of the cup-type packing element 44, a suitable side seal ring 48 may be mounted in the setting sleeve 42 for slidable sealing engagement with the wall 18 of the tubular member section 17.

The upper expander 35 is shiftable downwardly along the tubular member 15, but its reverse or upward shifting therealong is prevented by a one-way lock device. As specifically shown, a split ratchet ring 49 has external upwardly facing teeth 50 thereon adapted to engage companion internal downwardly facing teeth 51 in the tubular member section 17. The split ratchet ring or sleeve 49 has internal cam teeth 52 thereon engaging companion cam teeth 53 on the upper expander. The upper expander 35 can shift downwardly along the tubular member 17, the cam teeth 52, 53 coengaging and carrying the ratchet ring 49 downwardly along the tubular member, the teeth 50 of the ratchet ring ratcheting freely downwardly along the tubular member teeth 51. However, in the event the upper expander 35 were to tend to move upwardly of the tubular member, its inclined cam teeth 53 would engage the companion teeth 52 on the ratchet ring 49 and urge the latter outwardly to insure full meshing of its teeth 50 with the tubular member teeth 51, thereby precluding upward movement of the upper expander along the tubular member.

The setting sleeve or ring 42 is disposed initially in the position shown in FIG. 1b. It is movable downwardly along the tubular member 15 and toward the upper expander 35. However, it is prevented from moving upwardly with respect to the upper expander from its initial position by a plurality of tie bars 55 extending through slots or grooves 56 in the slip sleeve 38 and having upper, inward projections 57 engaging a lower shoulder 58 of an elongate peripheral groove 59 formed in the setting sleeve, and lower inward projections 60 disposed within a peripheral groove 61 in the expander and engaging the upper shoulder 62 thereof. Any tendency for the setting sleeve 42 to shift upwardly is prevented since the upward thrust is transmitted through the tie bars 55 to the upper expander 35 and from the latter through its ratchet ring 49 and the ratchet teeth 50, 51 to the tubular member 15. However, downward movement of the setting sleeve 42 can occur relative to the upper expander 35 and the tie bars 55 in view of the lost motion initially provided between the upper ends 57 of the tie bars 55 and the upper end 64 of the setting sleeve groove 59.

The liner hanging apparatus A has its slips and packing structure parts disposed initially in their outward position within the tubular member 15, free from projection into the passage through the casing string C. In order to prevent equipment that might be moved down through the casing string and the liner hanging apparatus from damaging parts of the latter, or prematurely effecting inward shifting of the slip and packing structure parts, such parts are covered initially by a protector sleeve 66 extending within all of the liner hanging parts, with its lower end 67 bearing against a shoulder 68 in the tubular member 17. This protector sleeve has an upper head 69 slidable along the enlarged inner wall 18 of the tubular member section 17, which is disposed initially a substantial distance below the upper shoulder 19 of the tubular member, and below an inwardly projecting circumferential latch shoulder 70 disposed immediately below such upper shoulder. The distance from the upper end of the sleeve head 69 to the latch shoulder 70 is greater than the distance from the upper end of the sleeve head 69 to the tubular member shoulder 68 when the lower end 67 of the protector sleeve 66 bears thereagainst, so as to enable elevation of the protector sleeve to a sufficient extent as to dispose the lower end 67 of the protector sleeve above a cup-type packing element 44, thereby freeing all parts of the liner hanging apparatus for movement in effecting setting of the liner B in packed-off condition in the well casing C.

Initially, the protector sleeve 66 is retained in its protective position within the liner hanger parts by one or a plurality of shear screws 71 securing it to the tubular member section 17. Its sleeve head 69 has a plurality of flexible latch arms 72 extending upwardly therefrom and integral therewith, there being a peripheral groove 73 in the upper portions of these latch arms providing latch fingers 74 having outer tapered surfaces 75 adapted to engage a companion tapered surface 76 at the lower end of the latch shoulder 70. When the latch fingers 74 engage the tapered surface 76 of the latch shoulder, they flex inwardly, allowing the fingers to slide to a position above the shoulder 70 and flex outwardly to be disposed above the latch shoulder, thereby latching the sleeve head 69 and the protector sleeve 66 in its upper position, after the protector sleeve has been shifted upwardly within the tubular member free from its position within the liner hanger apparatus parts. The sleeve head 69 has a pair of locating and locking grooves 77, 78 therewithin, the upper and lower sides 79 of the upper groove 77 tapering or diverging inwardly with respect to one another; whereas, the upper side 80 of the lower lock groove 78 is substantially normal to the axis of the apparatus.

With the liner hanger apparatus parts in the positions shown in FIGS. 1a and 1b and the protector sleeve 66 disposed therewithin, drilling or other operations can take place through the well casing C, as, for example, drilling of the well bore below the lower end of the well casing for reception of the liner B without danger of the drill pipe, and the like, engaging and adversely affecting the parts of the apparatus A. Any engagement will be against the inner wall of the protector sleeve 66. Similarly, the drill bit itself cannot inadvertently engage any of the parts of the apparatus A during its being elevated or lowered therethrough. The same is true of other equipment that may be lowered, raised, or otherwise manipulated in the casing string. For that matter, the running of the liner B in the well casing C and through the apparatus A cannot adversely affect the latter in view of the presence of the protector sleeve 66 therewithin. It is only upon disposition of the liner B in approximately its setting location in the well bore that the protector sleeve is removed, so that the liner hanging apparatus A can be actuated to effect inward movement of the slips 21, 38 and packaging structure 30–34 into engagement with the portion 10 of the liner B.

As disclosed in the drawings, a liner B of suitable length has its upper portion constituted as a tubular liner hanging body 10 comprising a lower section 82 threadedly secured to an upper section 83. This upper section has an upper threaded box 84 threadedly receiving a coupling nut 85 mounted on the mandrel 86 of the running-in tool D. The mandrel includes a mandrel sub 87 threadedly secured to the lower end of the tubing string E extending to the top of the well bore, the mandrel sub being threadedly attached to an intermediate mandrel section 88, which is, in turn, threadedly secured to the upper end of a lower mandrel section 89. The nut 85 bears against an upwardly facing shoulder 90 of the intermediate mandrel section 88 and is coupled for rotation to such section by a key 91 secured to the nut and slidable in an elongate keyway 92 in the mandrel section 88. Since the threaded connection 93 between the nut 85 and the liner hanging member or body 10 is preferably left hand, rotation of the tubular string E and mandrel 86 to the right will rotate the nut to the right and effect its unthreading from the liner hanging member box 84, the nut moving upwardly along the mandrel 86 because of the splined connection afforded by the key 91 sliding upwardly in the mandrel keyway 92.

The liner hanging body 10 has an outside diameter which is less than the internal diameter of the casing string C. The sections of the liner B secured to the lower end of the liner hanging body can have a smaller diameter, if desired. The liner hanging body 10 has an adequate length, such that the slips 21, 38 and packing structure and packing structure 30–34 can engage an uninterrupted peripheral surface 47 thereof. The cup-type packing member 44 itself is adapted to engage a retainer sleeve 95 which actually constitutes part of the liner hanging body 10, and which is adapted to retain a plurality of circumferentially spaced shifting dogs or keys 96 disposed in circumferentially spaced grooves 97 in the upper portion of the liner hanging body 10 (FIG. 7). These keys or dogs 96 are urged outwardly by springs 98 in the grooves, the dogs or keys having oppositely directed longitudinal wings or stop elements 99 engaging the retainer sleeve 95 on opposite sides of the sleeve slots 100, through which the keys or dogs project. The retainer sleeve 95 may be suitably secured, as by welding, to the liner hanging body 10, and, as stated above, actually constitutes a part thereof.

When the mandrel 86 is coupled to the liner hanging body 10, with the nut 85 threaded completely therewithin, a thrust sleeve 101 secured to the mandrel has its lower portion engaging the upper end of the liner hanging body 10. This thrust sleeve has an inwardly directed flange 102 overlying a mandrel sub shoulder 103, the flange being held against such shoulder by a suitable lock nut 104 threaded on the mandrel sub and bearing against the upper end of the thrust sleeve 101. The internal diameter of this thrust sleeve 101 is greater than the external diameter of the coupling nut 85 to permit the latter to move into the thrust sleeve 101 upon its unthreading from the box 84 of the liner hanging body 10.

The mandrel structure 86 extends downwardly through the liner hanging body 10. The mandrel and the liner hanging body control circulation of fluid downwardly through the tubular string E, mandrel 86 and liner B and upwardly around the exterior of the liner, through the liner hanging apparatus A and the tubing-casing annulus F above the liner hanging apparatus. As shown, the liner hanging body member 83 has a plurality of circumferentially spaced side ports 110 in its lower portion communicating with external longitudinal grooves or passages 111 extending substantially to its lower end. Thus, fluid can flow upwardly through the grooves 111 and into the ports 110, then passing between the mandrel 86 and the inner wall 112 of the liner hanging body 10. To increase the passage area, the mandrel has circumferentially spaced external circulation grooves or passages 113 extending therealong, the passages terminating within the thrust sleeve 101 which has side ports 114 therein to permit fluid to flow into the tubing-casing annulus F. To increase the passage area, the nut 85 may have circumferentially spaced internal longitudinal grooves 115 opposite the mandrel grooves 113.

Figure 2B:
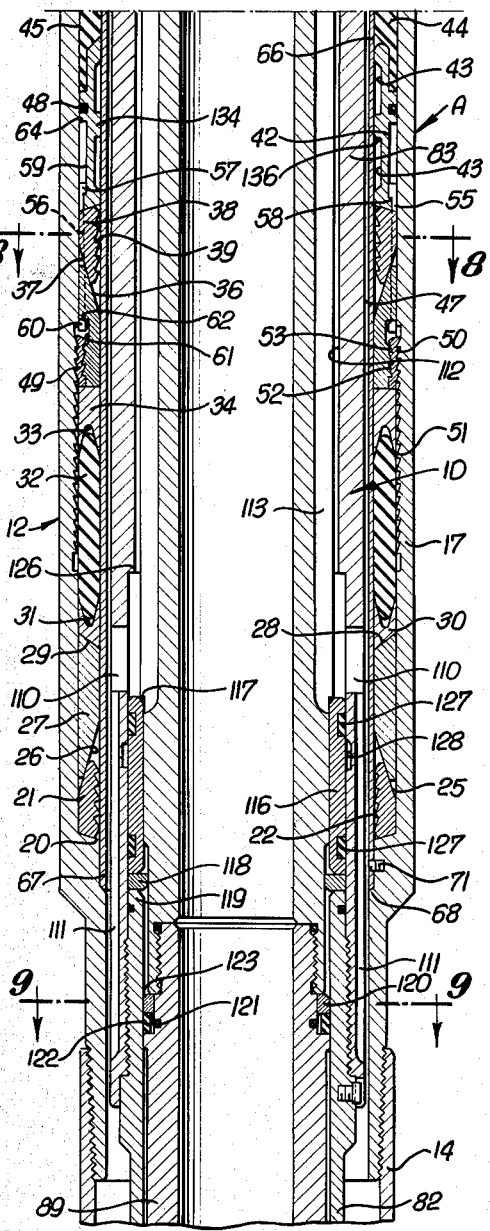

Initially, the ports 110 through the liner hanging body 10 are open, but such ports are adapted to be closed by shifting a sleeve valve 116 slidably mounted within the liner hanging body 83, which is disposed initially in a lower position, as shown in FIG. 2b. This lower position is assured by the engagement of a downwardly facing mandrel shoulder 117 with the upper end of the sleeve 116, the lower end of the sleeve resting upon a split, inherently expansible valve shifting ring 118, which, in turn, rests upon the upper end 119 of the lower liner hanging section 82. Disposed initially below the split valve shifting ring 118 is an actuating ring 120 secured between the intermediate and lower mandrel sections 88, 89. This actuating ring 120 may form the upper end of a mandrel groove 121 containing a seal ring 122 sealing against the inner wall of the lower liner hanging section 82. The actuating ring 120 has an upper beveled corner 123 adapted to engage a lower inner beveled corner 124 of the split actuating ring 118 when the mandrel is moved upwardly. Such engagement will cause the split valve shifting ring 118 to move upwardly along the wall of the liner hanging body 10, carrying the valve sleeve 116 upwardly therewith to the extent determined by engagement of the valve sleeve with an upper stop shoulder 126 on the liner hanging member, at which time the valve sleeve will be disposed fully across the ports 110 with spaced side seal rings 127 on the valve sleeve on opposite sides of such ports. When the valve sleeve 116 engages the stop shoulder 126, the split ring 118 is disposed opposite a release groove 128 in the liner hanging member 10, the ring 118 inherently expanding outwardly into this groove and free from engagement with the mandrel actuating ring 120, thereby allowing the mandrel 86 to move upwardly through the valve shifting ring 118.

The parts of the liner hanging apparatus A initially occupy the positions illustrated in FIGS. 1a and 1b, in which the protector sleeve 66 is disposed across the inner faces of the parts of the apparatus. The tubular member 15 is secured to the upper and lower casing sections 13, 14 and is lowered with the casing string C in the well bore to the desired setting location. If desired, the casing string can be cemented in place in a known manner, the movement of parts and material down through the casing string being incapable of affecting the apparatus in view of the protection afforded by the sleeve 66. Thereafter, the lowering of a drill bit, and other equipment, through the casing string for the performance of operations in the wall bore below the apparatus will not adversely affect the latter because of the presence of the protective sleeve.

When the liner B is to be run and set in the well casing, it is secured to the running-in tool D, the appropriate length of liner connected to and extending below the liner hanging member 10, the parts occupying the relative positions illustrated in FIGS. 2a and 2b. The mandrel sub 87 is secured to the lower end of the tubular string E and the liner B lowered through the well casing C. At this time, the liner hanging body ports 110 are open and fluid can not only pass around the liner hanging member 10, but also through these ports, the longitudinal passages 113, and the thrust sleeve ports 114 into the tubing-casing annulus F above the liner hanging member 10.

The dogs or keys 96, which are elongate, have a length substantially greater than the length of the coupling spaces in the casing string C, so as to be incapable of passing thereinto. At that, the lower ends 130 of the dogs are tapered in a downward and inward direction so that the dogs will shift inwardly out of any such coupling spaces, the upper ends 131 also tapering in an upward and inward direction. The dogs have grooves 132 in their mid portions adapted to receive the ribs 133 separating the locating and lock grooves 77, 78 of the sleeve head 69 and also the ribs 134 separating the locating and lock grooves 43 of the setting sleeve 42. The upper and lower sides 135 of the intermediate dog grooves 132 are substantially normal to the axis of the apparatus, so as to be capable of being coupled to the upper side 80 of the locating and lock groove 78 in the protective sleeve head 69, and also the lower side 136 of the upper lock groove 43 in the setting sleeve 42.

The tubular string E, running-in tool D and the liner B are lowered until the dogs or keys 96 shift into the locating grooves 77, 78 in the sleeve head 69, which position can be determined by appropriate measurements of the tubing string E lowered in the well bore (FIGS. 2a, 2b). After the keys are shifted outwardly by the springs 98 into the locating and lock grooves 77, 78, the tubing string E is elevated, this upward movement being transmitted from the mandrel shoulder 90 to the lock nut 85, and from the lock nut to the liner hanging body 10, exerting an upward force on the dogs 96, which is transmitted through the dog shoulders 135 to the sleeve 66, resulting in shearing of the screws 71 holding the protective sleeve to the tubular member; whereupon the protective sleeve is shifted upwardly within the tubular member 15 and along the liner hanging parts mounted in its recess 18 to the extent at which the latch fingers 74 snap over the latch shoulder 70 and then outwardly, so as to retain the protector sleeve 66 in its upper position within the tubular member 15, in which its lower end 67 is above the cup-type packing element 44, as disclosed in FIGS. 3a and 3b.

Figure 4A:
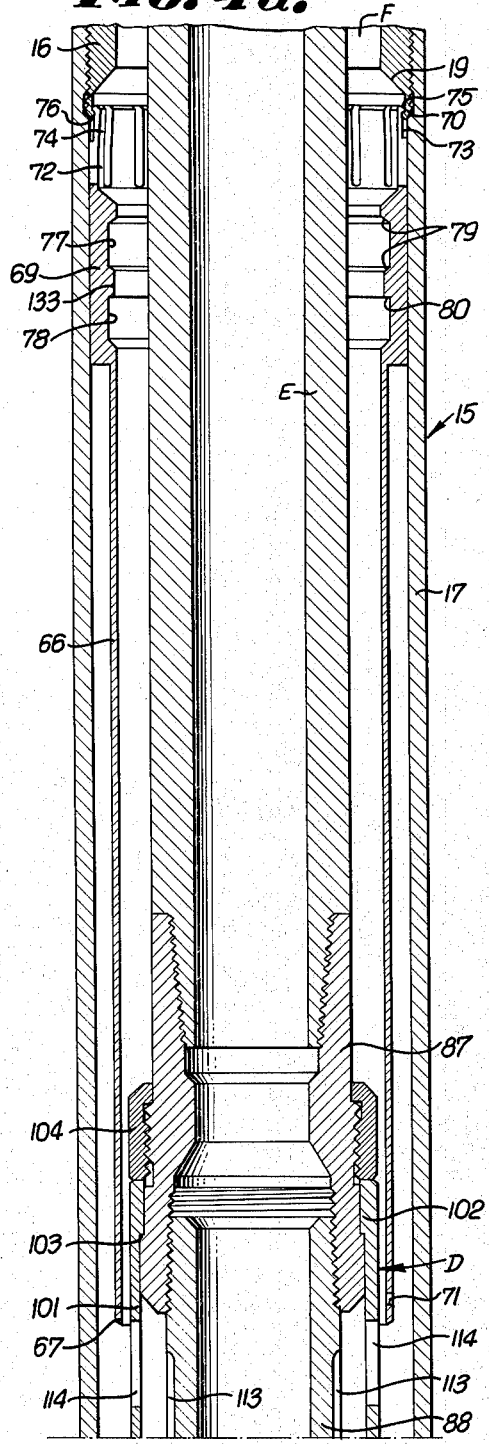
Figure 4B:
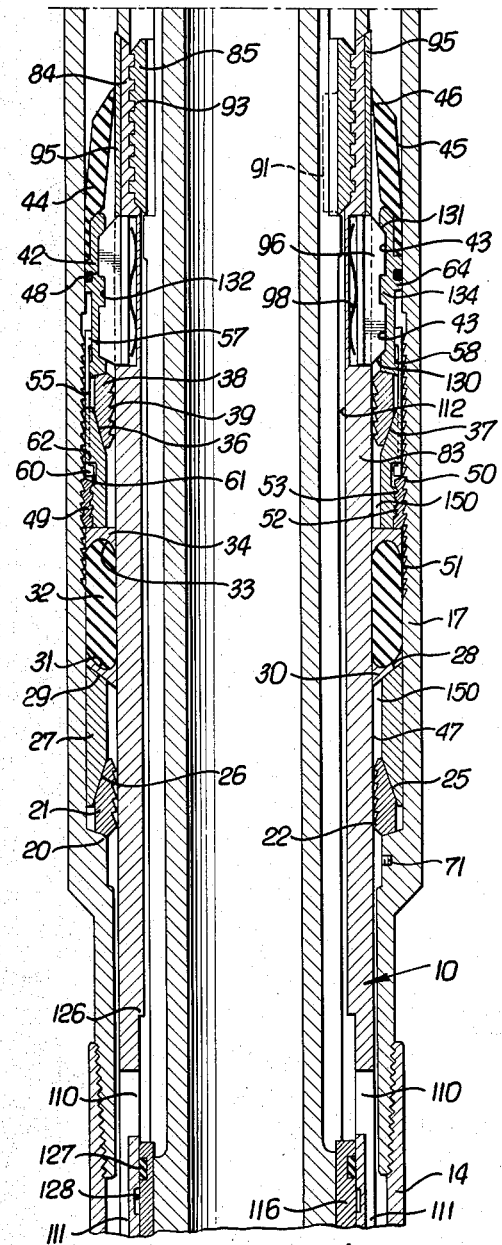

The tubular string E can now be lowered, such downward movement being transmitted through the mandrel sub 87 and its lock nut 104 to the thrust sleeve 101, and from the latter to the liner hanging body 10, the downward force being transmitted from the body to the lock dogs 96. Since the lower sides 79 of the locating grooves 77, 78 of the protector sleeve head are tapered in a downward and inward direction, the keys are cammed inwardly from the protector sleeve 66, which is prevented from moving downwardly by the coupling of the latch fingers 74 to the tubular member shoulder 70, the dogs sliding downwardly along the stationary protector sleeve 66, the liner B also moving downwardly within the well bore until the dogs or keys 96 come opposite the grooves 43 of the setting sleeve 42, the springs 98 shifting the dogs into such grooves and coupling the keys or dogs to the setting sleeve 42. The exertion of downward force and movement on the tubular string E will now cause the thrust sleeve 101 to shift the liner hanging body 10 and liner B downwardly, to shift the setting sleeve 42 toward the lower shoulder 20 of the tubular member 15. This action will shift the lower expander 27 within the lower slip sleeve 21 to expand the latter inwardly into engagement with the periphery 47 of the liner hanging member 10, whereupon the upper expander 35 will be shifted toward the lower expander 27 to shorten the packing sleeve structure and expand the packing sleeve 32 and the extrusion preventing rings 30, 34 inwardly into sealing engagement with the periphery 47 of the liner hanging member 10, the continued downward movement of the setting sleeve 42 within the tubular member 15 shifting the upper slip sleeve 38 downwardly along the upper expander 35 and inwardly into engagement with the periphery 47 of the liner hanging body (FIGS. 4a, 4b).

In lieu of the downward thrust being transmitted through the tubing string E and the thrust sleeve 101 to accomplish this action, the weight of the liner B may be sufficient to produce adequate motion of the setting sleeve 42 downwardly in the tubular member 15 to secure the firm anchoring of the upper and lower slip sleeves 38, 21 against the periphery 47 of the liner hanging body and of the packing structure 30–34 into firm sealing engagement with the latter. If desired, additional downward thrust can be imposed on the setting sleeve 42 through the tubing string E, for the purpose of insuring the firm embedding of the slip teeth 22, 39 in the periphery of the hanging body 10, the full expansion of the packing sleeve 32 inwardly against the periphery 47 of the body 10, and the full deformation of the extrusion preventing rings 30, 34 against the periphery of the body, wherein such rings bridge the annular clearance spaces 150 between the upper and lower expanders 35, 27 and the periphery 47 of the liner hanging body 10, to preclude cold flow or extrusion of the packing sleeve material through such clearance spaces. During downward shifting of the upper expander 35 along the tubular member 15, the ratchet sleeve 49 ratchets freely downwardly along the companion teeth 51 of the tubular member 15. However, return or upward movement of the expander 35 is prevented by the one-way coupling or clutching action of the sleeve teeth 50 with the tubular member teeth 51.

If, for some reason, the shifting dogs 96 cannot move downwardly to a position in which they enter the locating and lock grooves 43 in the setting sleeve 42, the packing cup 44 will still flex inherently inwardly into sealing engagement with a portion of the periphery 47 of the liner haning member 10. In this connection, the liner hanging member 10 may be made much longer than as shown in the drawings to allow a reasonable margin of error in the final location of the liner B in the well bore. With the lip portion 46 of the cup-type packing element 44 engaging the periphery 47 of the liner engaging member, the fluid in the tubing-casing annulus F can be subjected to pressure, which will act upon the packing element 44 and shift it and the setting sleeve 42 downwardly along the tubular member 15 and the liner hanging member 10, for the purpose of setting the upper and lower slip members 38, 21 against the periphery 47 of the liner hanging member and the packing structure 30–34 into sealing engagement with the periphery of the liner hanging member, the slips and packing structure then occupying essentially the same position as illustrated in FIG. 4b.

Folowing anchoring of the liner hanging member 10 in packed-off condition with respect to the well casing, fluid can be circulated down through the tubular string E, flowing through the mandrel 86 into the liner B and down through the liner for discharge from its lower portion, or any other opening in the liner, the fluid then flowing upwardly around the exterior of the liner B into and through the longitudinal grooves 111, the ports 110, longitudinal mandrel grooves 113, and coupling nut grooves 115, for discharge through the thrust sleeve ports 114 into the tubing-casing annulus F, for continued movement to the top of the well bore. If desired, cement slurry, or other cementitious material, can be pumped down the tubing string E, passing through the mandrel 86 into the liner B, and being discharged from the lower end of the liner for upward passage around the exterior of the liner to effect a cementing of the latter in the well bore. The fluid in advance of the cementitious material will pass upwardly through the circulation path described above.

The circulation path can be closed by shifting the sleeve valve 116 upwardly along the liner hanging member 10. The tubing string E and mandrel 86 are rotated to the right, for the purpose of rotating the nut 85 within the threaded box 84 of the liner hanging member, the nut shifting upwardly along the mandrel 86 until it has been unscrewed completely from the liner hanging member 10. The tubular string E and mandrel 86 are then elevated, which will bring the actuating ring 120 on the mandrel into engagement with the split shifting ring 118, the upward movement of the latter within the liner hanging member 10 shifting the valve sleeve 116 upwardly until it is disposed in engagement with the top shoulder 126 fully across the body ports 110, closing the latter against flow of fluid in both directions. As described above, the valve shifting ring 118 will expand inherently into the release groove 128, free from engagement with the actuating ring 120, the split ring then functioning as a lower stop preventing downward shifting of the sleeve valve 116 to port opening position. The tubing string E and setting tool D can now be elevated, the actuating ring 120 moving through the split ring 118 and the sleeve valve 116, and along the inner wall 112 of the liner hanging member 10 for complete removal from the latter. The tubing string E can now be elevated through the well casing C to remove the running-in tool D completely therefrom, leaving the liner B anchored in packed-off condition in the well casing.

We claim:

1. In apparatus for hanging a liner from a casing string disposed in a well bore: a tubular member adapted to be disposed in the well bore to constitute part of the casing string; laterally movable means in said tubular member; protective means disposed across said laterally movable means; a liner hanging member adapted to be lowered in the casing string to a position within said tubular member, protective means and laterally movable means; means for removing said protective means from its position across said laterally movable means after said liner hanging member has been positioned within said protective means and laterally movable means; and means for shifting said laterally movable means inwardly into engagement with said liner hanging member after removal of said protective means.

2. In apparatus for hanging a liner from a casing string disposed in a well bore: a tubular member adapted to be disposed in the well bore to constitute part of the casing string; laterally movable anchoring means in said tubular member; protective means disposed across said anchoring means; a liner hanging member adapted to be lowered in the casing string to a position within said tubular member, protective means and anchoring means; means for removing said protective means from its position across said anchoring means after said liner hanging member has been positioned within said protective means and anchoring means; and means for shifting said anchoring means inwardly into anchoring engagement with said liner hanging member after removal of said protective means.

3. In apparatus for hanging a liner from a casing string disposed in a well bore: a tubular member adapted to be disposed in the well bore to constitute part of the casing string; packing means in said tubular member; protective means disposed across said packing means; a liner hanging member adapted to be lowered in the casing string to a position within said tubular member, protective means and packing means; means for removing said protective means from its position across said packing means after said liner hanging member has been positioned within said protective means and packing means; and means for shifting said packing means into sealing engagement with said liner hanging member after removal of said protective means.

4. In apparatus for hanging a liner from a casing string disposed in a well bore: a tubular member adapted to be disposed in the well bore to constitute part of the casing string; packing means in said tubular member; laterally movable anchoring means in said tubular member; protective means disposed across said packing means and anchoring means; a liner hanging member adapted to be lowered in the casing string to a position within said tubular member, protective means, packing means and anchoring means; means for removing said protective means from its position across said packing means and anchoring means after said liner hanging member has been positioned within said protective means, packing means and anchoring means; and means for shifting said packing means and anchoring means inwardly into engagement with said liner hanging member after removal of said protective means.

5. In apparatus for hanging a liner from a casing string disposed in a well bore: a tubular member adapted to be disposed in the well bore to constitute part of the casing string; laterally movable means in said tubular member; protective means disposed across said laterally movable means; a liner hanging member adapted to be lowered in the casing string to a position within said tubular member, protective means and laterally movable means; means for elevating said protective means in said tubular member from its position across said laterally movable means after said liner hanging member has been positioned within said protective means and laterally movable means; and means movable downwardly in said tubular member for shifting said laterally movable means inwardly into engagement with said liner hanging member after elevation of said protective means.

6. In apparatus for hanging a liner from a casing string disposed in a well bore: a tubular member adapted to be disposed in the well bore to constitute part of the casing string; packing means in said tubular member; laterally movable anchoring means in said tubular member; protective sleeve means disposed across said packing means and anchoring means; a liner hanging member adapted to be lowered in the casing string to a position within said tubular member, protective means, packing means and anchoring means; means for elevating said sleeve means in said tubular member from its position across said packing means and anchoring means after said liner hanging member has been positioned within said protective means, packing means and anchoring means, and means movable downwardly in said tubular member for shifting said packing means and anchoring means inwardly into engagement with said liner hanging member after elevation of said sleeve means.

7. In apparatus for hanging a liner from a casing string disposed in a well bore: a tubular member adapted to be disposed in the well bore to constitute part of the casing string; laterally movable means in said tubular member; protective means disposed across said laterally movable means; a liner hanging member adapted to be lowered in the casing string to a position within said tubular member and laterally movable means; means for removing said protective means from its position across said laterally movable means; and means operated by said liner hanging member for shifting said laterally movable means inwardly into engagement with said liner hanging member after removal of said protective means.

8. In apparatus for hanging a liner from a casing string disposed in a well bore: a tubular member adapted to be disposed in the well bore to constitute part of the casing string; a liner hanging member adapted to be lowered on a running-in string in the casing string to a position within said tubular member; laterally movable means in and carried by said tubular member adapted to be shifted inwardly into engagement with said liner hanging member; protective means disposed across said laterally movable means; means responsive to manipulation of the running-in string for removing said protective means from its position across said laterally movable means; and means responsive to manipulation of the running-in string for shifting said laterally movable means inwardly into engagement with said liner hanging member after removal of said protective means.

9. In apparatus for hanging a liner from a casing string disposed in a well bore: a tubular member adapted to be disposed in the well bore to constitute part of the casing string; a liner hanging member adapted to be lowered on a running-in string in the casing string to a position within said tubular member; laterally movable means in and carried by said tubular member adapted to be shifted inwardly into engagement with said liner hanging member; protective means disposed across said laterally movable means; means responsive to manipulation of the running-in string for removing said protective means from its position across said laterally movable means; and means for shifting said laterally movable means inwardly into engagement with said liner hanging member after removal of said protective means.

10. In apparatus for hanging a liner from a casing string disposed in a well bore: a tubular member adapted to be disposed in the well bore to constitute part of the casing string; laterally movable means in said tubular member; protective means disposed across said laterally movable means; a liner hanging member adapted to be lowered in the casing string to a position within said tubular member and laterally movable means; means operated by said liner hanging member for removing said protective means from its position across said laterally movable means; and means operated by said liner hanging member for shifting said laterally movable means inwardly into engagement with said liner hanging member after removal of said protective means.

11. In apparatus for hanging a liner from a casing string disposed in a well bore: a tubular member adapted to be disposed in the well bore to constitute part of the casing string; packing means in said tubular member; protective means disposed across said packing means; a liner hanging member adapted to be lowered in the casing string to a position within said tubular member and packing means; means for removing said protective means from its position across said packing means; means for shifting said packing means into sealing engagement with said liner hanging member after removal of said protective means; means providing a fluid passage through said liner hanging member between regions in the casing string above and below said packing means with said packing means in sealing engagement with said liner hanging member; and means for closing said fluid passage.

12. In apparatus for hanging a liner from a casing string disposed in a well bore: a tubular member adapted to be disposed in the well bore to constitue part of the casing string; packing means in said tubular member; a liner hanging member adapted to be lowered in the casing string to a position within said tubular member and packing means; means for shifting said packing means into sealing engagement with said liner hanging member; means providing a fluid passage through said liner hanging member between regions in the casing string above and below said packing means with said packing means in sealing engagement with said liner hanging member; and means for closing said passage.

13. In apparatus for hanging a liner from a casing string disposed in a well bore: a tubular member adapted to be disposed in the well bore to constitute part of the casing string; packing means in said tubular member; a liner hanging member adapted to be lowered on a running-in string in the casing string to a position within said tubular member and packing means; means for shifting said packing means into sealing engagement with said liner hanging member; means providing a fluid passage through said liner hanging member between regions in the casing string above and below said packing means with said packing means in sealing engagement with said liner hanging member; and means responsive to manipulation of the running-in string for closing said fluid passage.

14. In apparatus for hanging a liner from a casing string disposed in a well bore: a tubular member adapted to be disposed in the well bore to constitute part of the casing string; packing means in said tubular member; a liner hanging member; a running-in tool secured to said liner hanging member and adapted to be lowered on a running-in string in the casing string to position said liner hanging member within said tubular member and packing means; means for shifting said packing means into sealing engagement with said liner hanging member; means providing a fluid passage through said liner hanging member between regions in the casing string above and below said packing means with said packing means in sealing engagement with said liner hanging member; valve means on said liner hanging member for controlling flow of fluid through said passage; and valve shifting means on said running-in tool engageable with said valve means to shift said valve means to a position closing said passage.

15. In apparatus for hanging a liner from a casing string disposed in a well bore: a tubular member adapted to be disposed in the well bore to constitute part of the casing string; packing means in said tubular member; a liner hanging member; a running-in tool releasably secured to said liner hanging member and adapted to be lowered on a running-in string in the casing string to position said liner hanging member within said tubular member and packing means; means for shifting said packing means into sealing engagement with said liner hanging member; means providing a fluid passage through said liner hanging member between regions in the casing string above and below said packing means with said packing means in sealing engagement with said liner hanging member; valve means on said liner hanging member for controlling flow of fluid through said passage; valve shifting means on said running-in tool engageable with said valve means to shift said valve means to a position closing said passage; and means for releasing said valve shifting means from said valve means to allow removal of said running-in tool from said liner hanging member and its withdrawal by the running-in string to the top of the well bore.

16. In apparatus for hanging a liner from a casing string disposed in a well bore: a tubular member adapted to be disposed in the well bore to constitute part of the casing string; a pliant, elastic packing element in said tubular member; an expander in said tubular member above said packing element; slip means in said tubular member above and engaging said expander; a setting sleeve in said tubular member above and engaging said slip means; a liner hanging member; a running-in tool releasably secured to said liner hanging member and adapted to be lowered on a running-in string in the casing string to position said liner hanging member within said tubular member, packing element, expander, and slip means; means for shifting said setting sleeve downwardly to move said slip means downwardly along said expander and said expander downwardly along said tubular member to shift said slip means and packing element inwardly into engagement with said liner hanging member; means providing a fluid passage through said liner hanging member between regions in the casing string above and below said packing element with said packing element in sealing engagement with said liner hanging member; valve means on said liner hanging member for controlling the flow of fluid through said passage; valve shifting means on said running-in tool engageable with said valve means to shift said valve means to a position closing said passage; and means for enabling said valve shifting means to be released from said valve means to allow removal of said running-in tool from said liner hanging member and its withdrawal by the running-in string to the top of the well bore.

17. In apparatus for hanging a liner from a casing string disposed in a well bore: a tubular member adapted to be disposed in the well bore to constitute part of the casing string; a pliant, elastic packing element in said tubular member; an expander in said tubular member above said packing element; slip means in said tubular member above and engaging said expander; a setting sleeve in said tubular member above and engaging said slip means; a liner hanging member; a running-in tool releasably secured to said liner hanging member and adapted to be lowered on a running-in string in the casing string to position said liner hanging member within said tubular member, packing element, expander, and slip means; means for shifting said setting sleeve downwardly to move said slip means downwardly along said expander and said expander downwardly along said tubular member to shift said slip means and packing element inwardly into engagement with said liner hanging member; means providing a fluid passage through said liner hanging member between regions in the casing string above and below said packing element with said packing element in sealing engagement with said liner hanging member; valve means on said liner hanging member for controlling the flow of fluid through said passage; valve shifting means on said running in tool engageable with said valve means to shift said valve means to a position closing said passage; means for enabling said valve shifting means to be released from said valve means to allow removal of said running-in tool from said liner hanging member and its withdrawal by the running-in string to the top of the well bore; a protective sleeve within said tubular member disposed across said packing element and slip means prior to inward movement of said slip means and packing element into engagement with said liner hanging member; and means for removing said protective sleeve from its position across said packing element and slip means.

18. In apparatus for hanging a liner from a casing string disposed in a well bore: a tubular member adapted to be disposed in the well bore to constitute part of the casing string; a pliant, elastic packing element in said tubular member; an expander in said tubular member above said packing element: slip means in said tubular member above and engaging said expander; a setting sleeve in said tubular member above and engaging said slip means; a liner hanging member; a running-in tool releasably secured to said liner hanging member and adapted to be lowered on a running-in string in the casing string to position said liner hanging member within said tubular member, packing element, expander, and slip means; laterally shiftable dogs on said liner hanging member adapted to be coupled to said setting sleeve to transmit downward movement of said liner hanging member to said setting sleeve to move said slip means downwardly along said expander and said expander downwardly along said tubular member to shift said slip means and packing element inwardly into engagement with said liner hanging member; means providing a fluid passage through said liner hanging member between regions in the casing string above and below said packing element with said packing element in sealing engagement with said liner hanging member; valve means on said liner hanging member for controlling the flow of fluid through said passage; valve shifting means on said running-in tool engageable with said valve means to shift said valve means to a position closing said passage; and means for enabling said valve shifting means to be released from said valve means to allow removal of said running-in tool from said liner hanging member and its withdrawal by the running-in string to the top of the well bore.

19. In apparatus for hanging a liner from a casing string disposed in a well bore: a tubular member adapted to be disposed in the well bore to constitute part of the casing string; a pliant, elastic packing element in said tubular member; an expander in said tubular member above said packing element; slip means in said tubular member above and engaging said expander; a setting sleeve in said tubular member above and engaging said slip means; a liner hanging member; a running-in tool releasably secured to said liner hanging member and adapted to be lowered on a running-in string in the casing string to position said liner hanging member within said tubular member, packing element, expander, and slip means; laterally shiftable dogs on said liner hanging member adapted to be coupled to said setting sleeve to transmit downward movement of said liner hanging member to said setting sleeve to move said slip means downwardly along said expander and said expander downwardly along said tubular member to shift said slip means and packing element inwardly into engagement with said liner hanging member; means providing a fluid passage through said liner hanging member between regions in the casing string above and below said packing element with said packing element in sealing engagement with said liner hanging member; valve means on said liner hanging member for controlling the flow of fluid through said passage; valve shifting means on said running-in tool engageable with said valve means to shift said valve means to a position closing said passage; means for enabling said valve shifting means to be released from said valve means to allow removal of said running-in tool from said liner hanging member and its withdrawal by the running-in string to the top of the well bore; a protective sleeve in said tubular member disposed initially across said slip means and packing element; said protective sleeve having means thereon adapted to be coupled to said shiftable dogs, whereby said liner hanging member can remove said protective sleeve from its position across said slip means and packing element prior to inward movement of said slip means and packing element into engagement with said liner hanging member.

References Cited by the Examiner
UNITED STATES PATENTS

| | | | |
|---|---|---|---|
| 2,017,451 | 10/1935 | Wickersham | 166—14 X |
| 2,593,725 | 4/1953 | Brown | 166—14 |
| 2,672,199 | 3/1954 | McKenna | 166—121 X |
| 2,864,450 | 12/1958 | Burns | 166—14 X |
| 3,137,348 | 6/1964 | Ahlstone et al. | 166—89 |

CHARLES E. O'CONNELL, *Primary Examiner.*

BENJAMIN HERSH, *Examiner.*